Aug. 6, 1946.  W. T. TABB  2,405,466
FLUID TRANSFER APPARATUS
Filed Sept. 14, 1943  2 Sheets-Sheet 1

INVENTOR.
WARNER T. TABB
BY
Hoguet, Neary & Campbell
his ATTORNEYS

Aug. 6, 1946.　　　W. T. TABB　　　2,405,466
FLUID TRANSFER APPARATUS
Filed Sept. 14, 1943　　　2 Sheets-Sheet 2

INVENTOR.
WARNER T. TABB
BY
his ATTORNEYS

Patented Aug. 6, 1946

2,405,466

UNITED STATES PATENT OFFICE 2,405,466

FLUID TRANSFER APPARATUS

Warner T. Tabb, Brooklyn, N. Y., assignor to Eisemann Corporation, Brooklyn, N. Y., a corporation of Delaware Application September 14, 1943, Serial No. 502,262

10 Claims. (Cl. 103—150)

This invention relates to pumps and relates more particularly to improvements in diaphragm pumps to cause the fluid to be delivered more smoothly by such pumps and under more uniform pressure.

Diaphragm pumps of the type commonly used heretofore include a vibrating diaphragm by means of which fluid is drawn through a suitable inlet valve and discharged through an outlet valve. The operation of the diaphragm causes pulsations to be set up in the fluid and, depending upon the rate of operation of the diaphragm, causes wide variations in the fluid pressure in the pump chamber.

In order to damp the pulsations in the fluid, reduce the shock on the pump parts, and permit the fluid to follow the pulsations of the diaphragm, it has been common to provide air receiving domes over the inlet and outlet valves or to interpose between the dome and the fluid in the pump flexible diaphragms which expand and contract and thereby reduce the pulsations of the fluid.

The pulsation damping diaphragms in the domes are vibrated rapidly and are subjected to widely varying pressures. As a result, these diaphragms rupture during operation and their damping function is destroyed.

It is extremely difficult, if not impossible, to provide a diaphragm within a reasonable space in the dome which is sufficiently strong to resist the pressure of the fluid without rupturing and at the same time is sufficiently flexible to expand and contract in accordance with the pulsations set up in the fluid.

The use of the domes without diaphragms has not been successful for the reason that the turbulence in the fluid has a tendency to mix the air with the fluid and carry the air away with the fluid delivered by the pump, thereby ultimately eliminating the air from the dome and destroying its damping effect. Loss of air from the open dome type of pulsation damper can be avoided by making the dome of large capacity and with only a small opening communicating with the pump chamber, but such large capacity domes causes an increase in the size of the pump and if the opening is small enough to prevent depletion of the air, the flow of air and/or fluid is throttled, thereby defeating the purpose of the dome.

Another disadvantage of prior types of diaphragm pumps is that the pressure in the fluid delivered from the pump has a tendency to increase objectionably under certain conditions and thus for many purposes, where a uniform pressure is desired, such pumps are not altogether satisfactory.

An object of the present invention is to provide a pulsation damping means for pumps which permits the use of relatively small domes for the pulsation damping air and which at the same time prevents loss of air from the dome.

Another object of the invention is to provide a pulsation damping means which reduces turbulence in the fluid in contact with the air in the dome and thereby prevents excessive mixing of the air with the fluid and loss of air from the dome.

Another object of the invention is to provide a pulsation damping means including a pulsation damping separator which is not subject to breakage or rupturing during service.

A still further object of the invention is to provide a pressure control mechanism in a diaphragm pump which permits the delivery of fluid at a substantially constant pressure throughout the normal operating range of the pump and prevents the building up of excessive pressures under all conditions.

Another object of the invention is to provide a pressure control means for diaphragm pumps by means of which the pressure of the fluid delivered by such pumps may be related to any other desired pressure in the system.

Other objects of the invention will become apparent from the following description of typical forms of pumps embodying the present invention.

In accordance with the present invention, I have provided a pulsation damping means for diaphragm pumps which includes a baffle or free floating separator plate between the air-receiving dome and the pumping chambers which permits ready compression of the air in the dome and at the same time prevents turbulence in the fluid and mixing of the fluid with the air in the dome.

More particularly, the plate which is formed of relatively stiff sheet material is mounted in the mouth or inlet of the dome so as to obstruct the flow of air from the dome, while at the same time being bodily movable to permit the fluid to pass the plate readily in either direction. The plate, therefore, acts as a pulsation damper and together with the air in the dome assures a smoother flow of the fluid through the pump without exhausting the air from the dome.

In conjunction with the pulsation damper described generally above, the pump may be provided with connections between the suction and pressure sides of the pump which are responsive to pressure differentials to cause a discharge of the fuel from the pressure side of the pump to the suction side to render the pressure of the fluid discharged from the pump more uniform throughout the operating range of the pump and to prevent excessive pressures under emergency conditions.

The pressure-responsive means may take the form of a spring biased valve of the plunger or ball type or a valve which is biased by the pressure of some other medium, such as the lubricating oil in the system, or air pressure. By properly regulating the biasing forces on the valve, the pump can be adjusted to deliver the fluid at substantially any desired pressure within its pumping capacity.

For a better understanding of the present invention, reference may be had to the accompanying drawings, in which.

Figure 1:
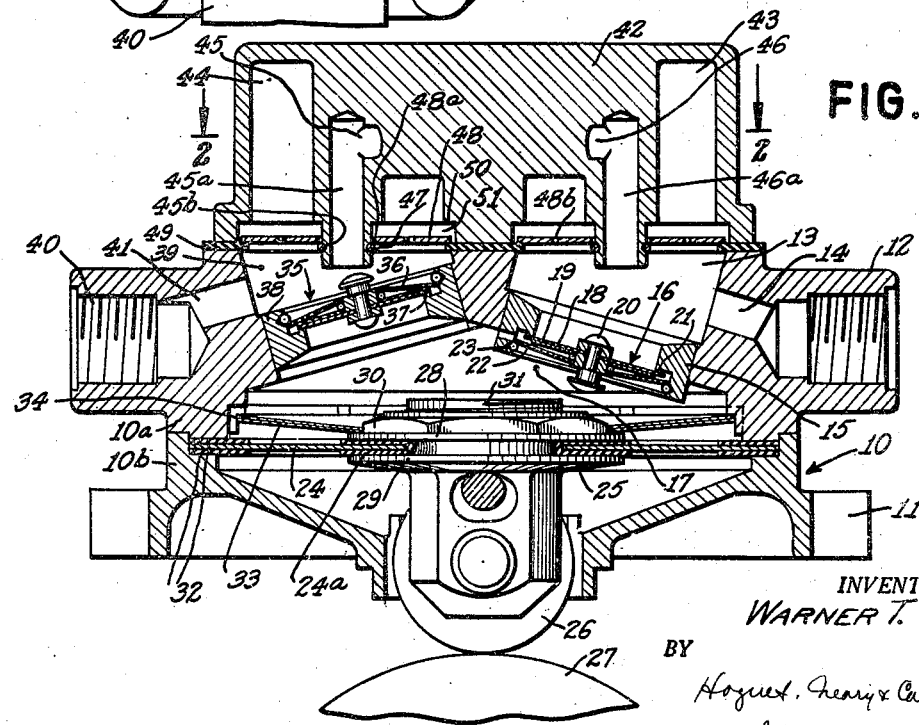
Figure 1 is a view in vertical cross-section of a typical form of diaphragm pump including the present invention.

Referring now to Figure 1, the diaphragm pump, chosen for illustrating the invention, may be of the type disclosed in my copending application Serial No. 435,117, filed March 17, 1942. This pump includes a lower casing section 10 of generally cylindrical cross-section having a flange 11 at the base thereof, permitting it to be secured to a support of any desired type (not shown). The cylindrical section 10 of the casing is provided with a threaded coupling 12 forming the inlet to the casing which communicates with a cylindrical chamber 13 by means of a passage 14. At the lower end of the chamber 13 is a retaining ring 15 in which is mounted a disc type valve 16 through which liquid can be drawn into a generally cylindrical pump chamber 17.

The valve 16 may consist of a disc 18 having a backing disc 19 centered thereon by a retaining pin 20 for stiffening the center portion of the disc. The edges of the disc 18 engage an annular rim 21 in the ring 15 forming the valve seat. The disc 18 is normally urged into contact with the seat 21 by means of a star-shaped or perforated disc-like spring 22, also mounted on the pin 20 and retained in the ring 15 by means of a snap ring 23.

The pumping diaphragm may consist of a flexible disc 24 of metal or other resilient and liquid-impervious material which is supported upon a plunger 25 having a roller 26 mounted thereon for engagement with an actuating cam 27. The diaphragm 24 has an annular gasket 24a at its inner edge which is gripped between a washer 28 and a flange 29 on the member 25 and is clamped therebetween by means of a nut 30 threaded on a threaded portion 31 of the member 25. The outer edge of the diaphragm 24 is also provided with a gasket 32 which is gripped between edge portions of the upper casing section 10a and the lower casing section 10b and retained in fluid-tight relationship therewith.

The diaphragm 24 and the supporting member 25 are normally urged downwardly by means of a perforated dished spring member 33 which engages the shoulders 34 projecting from the walls of the pump chamber 17 and the upper surface of the washer 28. The cam member 27, together with the spring 33, will cause the center portion of the diaphragm 24 to move upwardly and downwardly, thereby drawing fluid through the valve 16 upon downward movement and forcing it out through the valve 35 upon upward movement. The valve 35 is similar to the valve 16, with the exception that it is normally urged downwardly by a spring 36 onto its seat 37 and is displaced upwardly by the fluid pressure exerted thereon by the diaphragm 24. The valve 35 is supported upon a ring 38 which is mounted in a cylindrical discharge chamber 39 at the left hand side of the casing 10. The chamber 39 communicates with a discharge coupling 40 by means of a passage 41.

Figure 2:
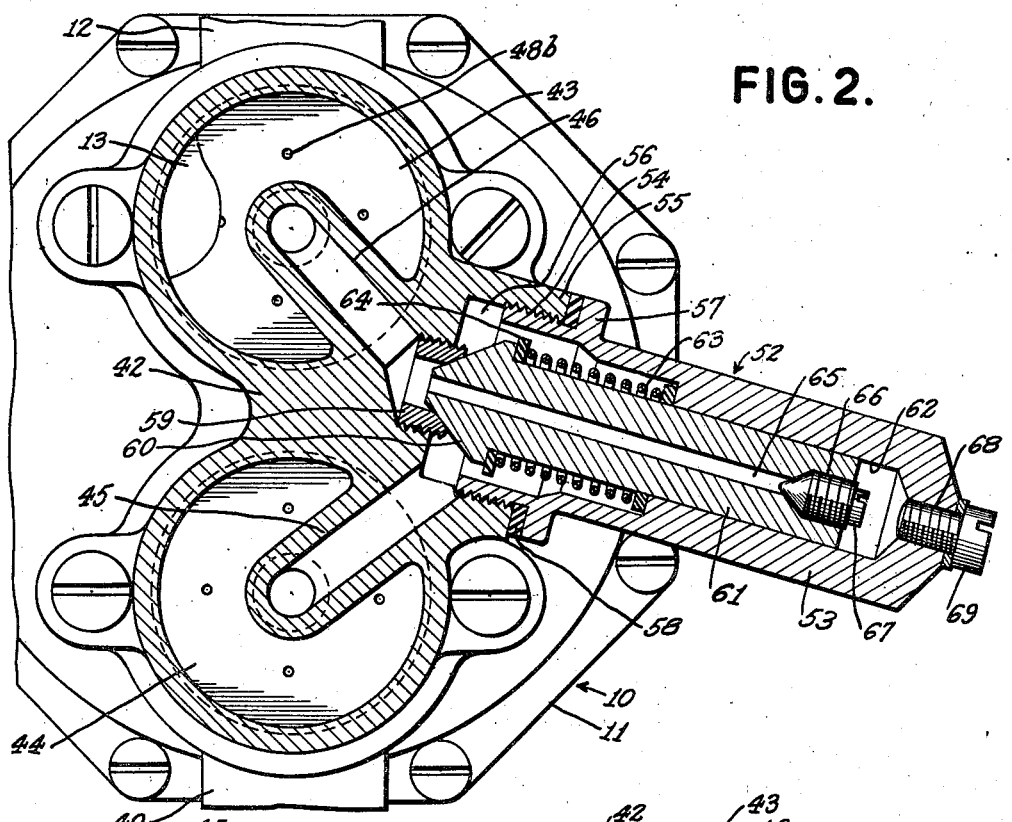
Figure 2 is a view in cross-section taken on line 2—2 of Figure 1.

The inlet chambers 13 and the outlet chamber 39 are closed by means of a dome casing 42 which is mounted on the upper end of the casing 10 and is of generally 8 shape, as viewed in Figure 2. The dome casing 42 is provided with two generally cylindrical chambers or domes 43 and 44 for receiving pulsation damping air. The dome 43 is in approximate alignment with the upper end of the suction or inlet chamber 13 and the chamber 44 is in alignment with the upper end of the pressure or discharge chamber 39.

Referring now to Figures 1 and 2, each of the chambers 43 and 44 has a conduit 45 and 46, respectively, projecting thereinto and terminating in the downwardly projecting portions 45a and 46a that are immersed in the fluid in the pump during operation of the pump so that air will not be drawn into the conduits 45 and 46 and the conditions in the dome will not be disturbed. The portions 45a and 46a are substantially the same and only one of these will be described in connection with the pulsation damping feature of the pump.

The lower end of the conduit portion 45a is of reduced size and is provided with a groove 45b for receiving a snap ring 47. The snap ring 47 is used to retain loosely on the conduit 45a a relatively stiff, light disc 48 for damping the pulsations in the fluid in the chamber 39. The disc 48 has a central aperture 48a received loosely on the reduced portion of the conduit 45a, permitting it to move up and down freely thereon. The edges of the disc 48 engage a sealing gasket 49 interposed between the housing 42 and the casing 10. Upward movement of the disc 48 may be limited by the shoulder 50 formed by a space 51 of increased cross-sectional area at the lower end of the dome 44.

The disc, as indicated above, may be formed of light sheet metal, such as aluminum or steel, or it may be formed of a plastic or fibrous material inasmuch as it does not have to withstand severe stresses due to its free movement up and down on the conduit 45a. As illustrated in Figure 2, the disc 48 may be provided with one or more apertures 48b permitting flow of fluid therethrough. If desired, a foraminous material providing a multiplicity of perforations may be used.

The function of the discs 48 is to permit a partial separation of the liquid in the intake and discharge chambers from the air in the domes 43 and 44 so that the air will not be withdrawn from the dome and discharged with the liquid. The disc thus serves as a separator without controlling the level of the liquid in the dome 44. The level of the liquid in the dome is determined by the size of the dome, the quantity of air trapped therein and the pressure of the fluid in the pump. Nevertheless, the discs 48 prevent excessive turbulence in the liquid above the disc and thereby prevent mixing of the air and the liquid and withdrawal of the air from the dome.

In order to regulate the pressure differential between the suction or inlet chamber 13 and the outlet chamber 39, the conduits 45 and 46 are connected to a pressure-responsive control means which permits partial discharge of the liquid from the pressure chamber 39 to the suction chamber 13.

As shown in Figure 2, one form of pressure regulator may take the form of a pressure-responsive valve 52, including a cylindrical casing member 53 which is provided with a threaded end portion 54 that is threaded into an internally threaded coupling 55. The coupling 55 is provided with a chamber 56 that communicates with both of the conduits 45 and 46. Proper sealing relationship between the cylindrical casing 53 and the coupling 55 is obtained by means of a flange 57 on the casing 53 which is utilized to compress a gasket 58 against the end of the coupling 55.

The conduit 46 communicates with a valve seat 59 for receiving the tapered valve plug 60. The valve plug 60 has a cylindrical plunger or stem 61 that is received slidably in the cylindrical bore 62 in the casing 53 to guide valve plug 60 into and out of contact with the valve seat 59.

The valve is normally urged toward the seat 59 by means of a spring 63 which is received in an enlarged chamber in the casing 53 and bears against a washer 64 engaging the enlarged head of the plug 60.

The valve, consisting of the head 60 and the stem 61 is provided with an axially extending passage 65 having an enlarged internally threaded portion 66 which may receive a threaded valve plug 67. The end of the casing 53 is also provided with a threaded opening 68 for receiving a threaded plug 69 for sealing the end of the casing 53.

In operation, the pressure-responsive device described above is responsive not only to the reduced pressure in the suction chamber 13 and the action of the spring 63, but also to the pressure of the liquid in the chamber 39. Thus, while the reduced pressure in the chamber 13 and the spring 63 normally urges the valve plug 60 into its seat 59, the pressure fluid in the conduit 45 normally tends to displace the plug from the seat. Inasmuch as the pressure fluid in the conduit 45 acts upon a larger area of the plug than does the suction in the conduit 46, there is a tendency for the plug to be unseated by the pressure. By regulating the strength of the spring 63 and the size of the valve plug 60, the valve plug will be unseated to permit liquid to flow from the pressure side of the pump to the intake or suction side at substantially any desired pressure differential. Thus, when the pressure differential between the suction and pressure sides of the pump exceeds a predetermined value, the plug will be unseated and the excess pressure differential is dissipated by escape of liquid to the suction side of the pump.

A further control over the operation of the valve 52 may be provided by removing the valve plug 67 from the valve stem. In this way, the suction either acts upon the stem and tends to unseat it against the action of the spring 63 or neutralizes the suction on the head 60, depending upon the relative size of the areas of the stem and the head exposed to the fluid on the suction side of the pump.

If desired, the valve disclosed in Figure 2 may be controlled in still another way, that is by relating it to some other predetermined exterior pressure. Thus, the plug 69 may be removed from the chamber 53, the plug 67 inserted in the valve stem and the casing 53 connected to an exterior source of pressure by a coupling to the threaded opening 68 in the chamber. For example, the valve stem may be rendered partially responsive to atmospheric air pressure or to a higher pressure. For example, if a tube connection is made from the aperture 68 to the sump area of a fuel injection pump in which a pressure is maintained as proposed in my copending application S. N. 498,246, a relationship will be established between the pressure in the injection pump sump and the pressures in the conduits 45 and 46. In such a case the pressure introduced at aperture 68 will act on the plunger 61 to hold it against its seat. The spring 63 in this case may be merely supplementary or may be removed entirely. If the spring 63 is removed the valve will remain closed except when the combined effects of pressure in the conduit 45 and suction in the conduit 46 are greater than the effect of the pressure introduced at the aperture 68.

Figure 3:
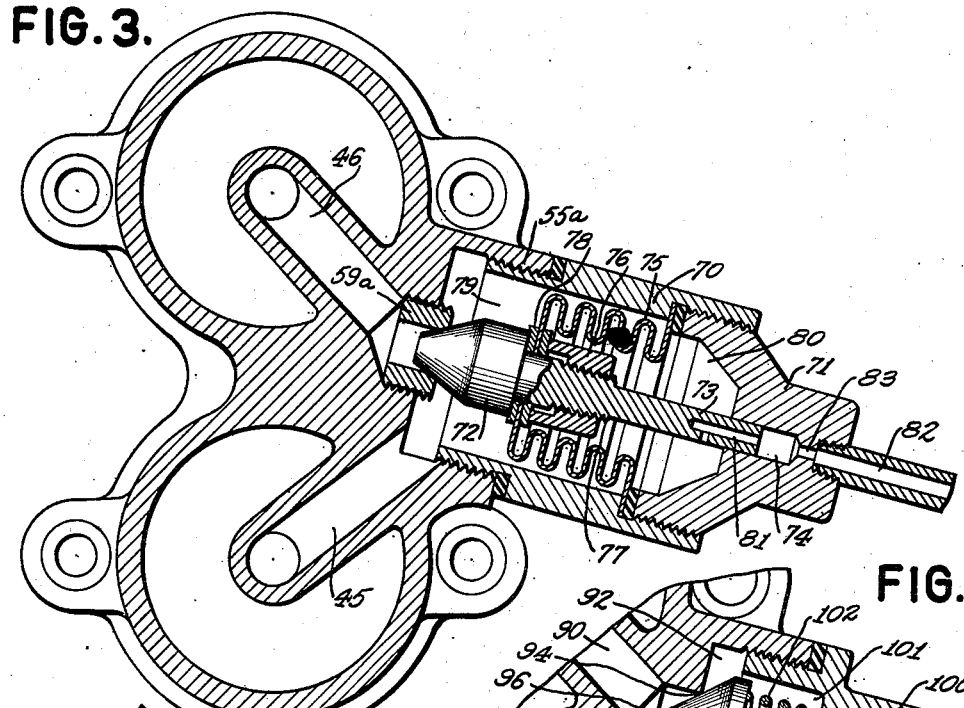
Figure 3 is a view in horizontal cross-section of a modified form of pressure-responsive means for controlling the pressure of the fluid delivered by the pump.

Another form of pressure regulating means that is responsive to the influence of an exterior medium is illustrated in Figure 3. In this form of pressure regulating means, a cylinder 70 is threadedly coupled to the coupling 55a and has its opposite end closed by an externally threaded cap 71. Cooperating with the valve seat 59a is a tapered valve plug 72 having a stem 73 extending into a bore 74 in the cap 71.

A bellows 75 has one end clamped between the cylinder 70 and the cap 71 and its opposite end is clamped and sealed to the valve plug 72 by means of a nut 76. The nut 76 engages a threaded portion 77 on the valve stem 73 and engages and forces the gaskets 78 into contact with the edge of the bellows, thereby sealing the space 79 outside the bellows from the space 80 behind the bellows.

The valve stem 73 is provided with an axial and transverse passage 81 that communicates with the space 80 so that fluid pressure may be supplied to the space 80 through a conduit 82 and the opening 83 that communicates with the bore 74 in the cap 71.

With this arrangement, the valve plug 72 is normally forced into the seat 59 by means of the pressure of the fluid in the chamber 80 as well as the suction on the plunger through the conduit 46. The plug 72 is urged out of the seat by means of the pressure in the chamber 79. When the pressure of the fluid on the pressure side of the pump and in the conduit 46 exceeds a predetermined maximum, it will displace the valve plug 72 and permit the liquid to escape from the pressure side of the pump to the suction side.

Figure 4:
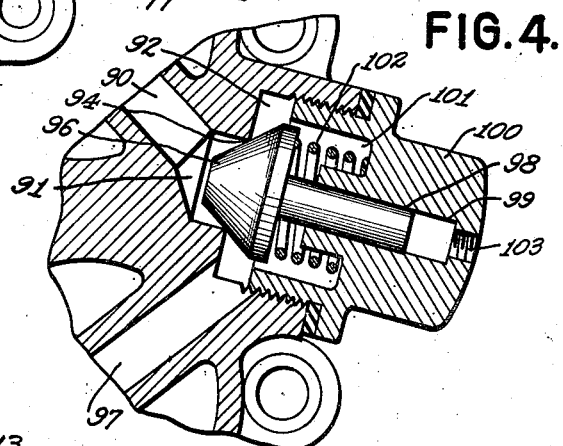
Figure 4 is a view in cross-section, and partly broken away, of another form of pressure-responsive valve control means.

The form of valve disclosed in Figure 4 is reversed from that disclosed in Figures 2 and 3 in so far as its reaction to pressure and suction are concerned. In the form of the invention disclosed in Figure 4, the pressure conduit 90 is connected to a recess 91 forming with the recess 92 in the fitting 83 a sharp-edged valve seat 94 for engaging the side of a conical valve plug 96. The suction conduit 97 communicates with the chamber 92 and thus with the lateral faces of the plug 96. The valve plug 96 is provided with a stem 98 which is received in a bore 99 of a cap 100 which is threadedly connected to the coupling 93. The cap 90 is provided with an enlarged chamber 101 for receiving a spring 102 that normally urges the valve plug 96 against the seat 94. The cap 90 may be provided with a threaded opening 103 which may be left open or sealed with a plug, not shown, to render the plug responsive to the pressure of air trapped in the chamber 99 or to atmospheric pressure, as desired.

In this form of the invention, the pressure in the conduit 99 normally tends to unseat the valve against the pressure of the spring 102. The suction in the line 97 likewise tends to unseat the plug 96. By relating these pressures and the strength of the spring, a very close control over the escape of liquid from the pressure side of the pump to the suction side of the pump can be obtained.

Figure 5:
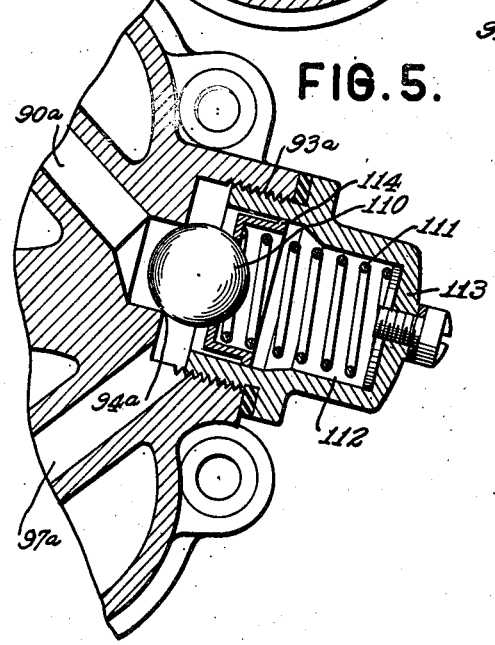
Figure 5 is a view in section, and partly broken away, of a still further form of pressure-responsive valve.

The form of the invention disclosed in Figure 5 is similar to that disclosed in Figure 4 with the exception that a ball type valve is used instead of a conical valve plug.

In this form of the invention the ball 110 is seated against the valve seat 94a, against the pressure fluid in the conduit 96a by means of a spring 111. The spring 111 is received in a chamber 112 in the cap 113 which is threadedly connected to the fitting 93a. The inner end of the spring 112 engages a flange on a centering ring 114 which in turn engages the ball and urges it into the seat. The operation of the ball valve is the same as the conical valve disclosed in Figure 4 described above, in that the ball is responsive to the difference in pressure between the fluid in the pressure conduit 90a and the suction conduit 97a.

From the preceding description of typical forms of pumps embodying the present invention, it will be apparent that these pumps effectively solve the problem of damping pulsations in the fluid in or delivered by the pump, while avoiding the possibility of damage to the pulsation damping means or inefficient functioning thereof. Moreover, the invention assures the close control of the pressure of the fluid delivered from the pump under wide operating conditions and prevents excessively high pressures from being built up in the pump when, for example, the pump outlet is closed, and, therefore, the objects of the invention have been attained.

It will be understood that the invention can be modified considerably without departing from the invention. That is, the type of valve plug and source of pressure for controlling the opening of the valve can be modified considerably and the shape and material from which the damping discs are formed are also capable of considerable modification. Moreover the pulsating damping means and pressure equalizing means may be applied to pumps of other types than diaphragm pumps in which pulsations are set up in the fluid by the action of the pump elements. Therefore, the forms of the invention illustrated herein should be considered as illustrative, only, and not as limiting the scope of the following claims.

I claim:

1. In a pulsation damping device; the combination of a chamber for receiving liquid subject to pulsations and a body of gas above said liquid for cushioning pulsations in the liquid, a separator plate loosely mounted in said chamber and being movable to permit the liquid to flow past the plate in either direction in response to variations in the pressure of said liquid; whereby turbulence of the liquid above said plate and escape of gas past said plate are minimized.

2. In a pulsation damping device; the combination of a gas-receiving chamber communicating with and receiving fluid subject to pulsations, a plate member in the lower portion of said gas-receiving chamber and means supporting said plate member for substantially free bodily movement in response to pulsations in the fluid.

3. In a pulsation damping device; the combination of a chamber receiving a liquid subject to pulsations, a gas-receiving chamber disposed above said liquid receiving chamber, a lightweight plate member between and partially separating said gas-receiving chamber and said liquid receiving chamber, and means supporting said plate member for substantially free bodily movement in response to pulsations in the fluid.

4. In a pulsation damping device for pumps having a vibratable diaphragm for drawing fluid through an inlet chamber and discharging the fluid through a discharge chamber; the combination of a gas-receiving chamber above each of said inlet and discharge chambers, a light-weight plate member between and partially separating at least one of said gas-receiving chambers and one of said inlet and discharge chambers, and means disposed centrally of said one of said gas-receiving chambers for supporting said plate member loosely for bodily movement axially of said dome.

5. In a pulsation damping device for pumps having a vibratable diaphragm for drawing a fluid through an inlet chamber and discharging the fluid through a discharge chamber; the combination of a gas-receiving chamber above at least one of said inlet and discharge chambers, means forming a substantially circular passage between said one chamber and said gas-receiving chamber, a light-weight disc member movably disposed in and partially closing said passage, and means supporting said disc for bodily movement in said passage to reduce the turbulence in the fluid in contact with the gas in said gas-receiving chamber.

6. In a pulsation damping device for pumps having a vibratable diaphragm for drawing a fluid through an inlet chamber and discharging the fluid through a discharge chamber; the combination of a gas-receiving chamber above at least one of said inlet and discharge chambers, means forming a substantially circular passage between said one chamber and said gas-receiving chamber, a perforate disc member movably disposed in and partially closing said passage, and means supporting said disc for bodily movement in said passage to reduce the turbulence in the fluid in contact with the gas in said gas-receiving chamber.

7. In a pulsation damping and pressure regulating mechanism for pumps having means for drawing fluid through an inlet chamber and discharging it through a discharge chamber; the combination of means forming a dome for receiving gas communicating with said inlet chamber, means forming a dome communicating with said discharge chamber, tubular members in each of said domes, one of said members communicating with said inlet chamber and the other communicating with said discharge chamber, light-weight disc members partially separating said domes from the respective chambers and having apertures for receiving said tubular members loosely, conduit means connecting said tubular members to permit fluid to flow from said discharge chamber to said inlet chamber, and pressure-responsive valve means in said conduit means for regulating the flow of fluid from said discharge chamber to said inlet chamber.

8. In a pulsation damping and pressure regulating mechanism for pumps having a means for drawing fluid through an inlet chamber and discharging it through a discharge chamber; the combination of means forming a dome for receiving gas communicating with said inlet chamber, means forming a dome communicating with said discharge chamber, tubular members disposed in each of said domes, one of said members communicating with said inlet chamber and the other communicating with said discharge chamber, light-weight disc members partially separating said domes from the respective chambers and having apertures for receiving said tubular members loosely, means connecting said tubular members to permit fluid to flow from said discharge chamber to said inlet chamber, and a normally closed valve for controlling the flow of fluid from said discharge to said inlet chambers comprising a spring urged valve plug movable in response to differential pressures between said inlet and discharge chambers for permitting return of fluid to said inlet chamber when said differential pressure exceeds a predetermined maximum.

9. In a pulsation damping and pressure regulating mechanism for pumps having means for drawing fluid through an inlet chamber and discharging it through a discharge chamber; the combination of means forming a dome for receiving gas communicating with said inlet chamber, means forming a dome communicating with said discharge chamber, tubular members in each of said domes, one of said members communicating with said inlet chamber and the other communicating with said discharge chamber, light-weight disc members supported loosely on said tubular members and partially separating said domes from the respective chambers, means connecting said tubular members to permit fluid to flow from said discharge chamber to said inlet chamber, and a normally closed valve for controlling the flow of liquid from said discharge chamber to said inlet chamber and comprising a valve seat, a valve plug, and means urging said plug into said seat with a predetermined pressure counter to the pressure of the fluid in said discharge chamber.

10. In a pulsation damping and pressure regulating mechanism for pumps having means for drawing fluid through an inlet chamber and discharging it through a discharge chamber; the combination of means forming a dome for receiving gas communicating with said inlet chamber, means forming a dome communicating with said discharge chamber, tubular members disposed in each of said domes, one of the said members communicating with said inlet chamber and the other communicating with said discharge chamber, light-weight disc members supported loosely on said tubular members and partially separating said domes from the respective chambers, means connecting said tubular members to permit fluid to flow from said discharge chamber to said inlet chamber, and a normally closed valve for controlling the flow of liquid from said discharge chamber to said inlet chamber comprising a valve seat, a valve plug, fluid pressure means urging said plug into said seat with a predetermined pressure counter to the pressure of the fluid in said discharge chamber.

WARNER T. TABB.